(12) United States Patent
Inaba (10) Patent No.: US 7,907,261 B2
(45) Date of Patent: Mar. 15, 2011

(54) OPTICAL AXIS INSPECTION METHOD AND OPTICAL AXIS INSPECTION APPARATUS

(75) Inventor: Tetsuaki Inaba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 162 days.

(21) Appl. No.: 12/208,982

(22) Filed: Sep. 11, 2008

(65) Prior Publication Data

US 2009/0073703 A1 Mar. 19, 2009

(30) Foreign Application Priority Data

Sep. 18, 2007 (JP) ................................ 2007-240684

(51) Int. Cl.
*G01J 1/00* (2006.01)
(52) U.S. Cl. .................... 356/121; 356/213; 362/460
(58) Field of Classification Search .................. 362/460, 362/465; 356/121, 213
See application file for complete search history.

(56) References Cited

U.S. PATENT DOCUMENTS

| | | | | |
|---|---|---|---|---|
| 4,634,275 | A * | 1/1987 | Yoshida et al. ............... | 356/121 |
| 4,647,195 | A * | 3/1987 | Ishikawa et al. ............. | 356/121 |
| 5,170,220 | A * | 12/1992 | Matsumoto et al. .......... | 356/121 |
| 5,321,439 | A * | 6/1994 | Rogers ........................ | 348/135 |
| 5,392,111 | A * | 2/1995 | Murata et al. ................ | 356/121 |
| 5,504,574 | A * | 4/1996 | Murata ........................ | 356/121 |
| 2006/0239019 | A1* | 10/2006 | Kiyota ......................... | 362/466 |

FOREIGN PATENT DOCUMENTS

| | | |
|---|---|---|
| DE | 43 29 332 A1 | 3/1994 |
| GB | 2 292 604 A | 2/1996 |
| JP | 59-024232 A | 2/1984 |
| JP | 63-113339 A | 5/1988 |
| JP | 2005-166588 A | 6/2005 |

OTHER PUBLICATIONS

Patent Abstracts of Japan, Publication No. 59-024232, Publication Date: Feb. 7, 1984, 1 page.
Patent Abstracts of Japan, Publication No. 63-113339, Publication Date: May 18, 1988, 1 page.
Patent Abstracts of Japan, Publication No. 2005-166588, Publication Date: Jun. 23, 2005, 1 page.
English abstract of German Publication No. 43 29 332 published on Mar. 3, 1994, esp@cenet database, 1 page.
Office Action for German Application No. 10 2008 046 384.1-51 dated Aug. 27, 2009 and English translation thereof, 9 pages.
Office Action for Chinese Application No. 200810161201.4, mailed Jun. 8, 2010 and English translation thereof, 10 pages.

\* cited by examiner

*Primary Examiner* — Evan Dzierzynski
(74) *Attorney, Agent, or Firm* — Osha Liang LLP (57) ABSTRACT

An optical axis inspection apparatus is provided with: a camera for capturing a light distribution pattern of a light source device projected on a screen; an image processing device for finding a cutoff line in the light distribution pattern; an acceptance reference cutoff line setting unit; and a shade having an oblong slit and arranged to be opposed to a projection lens of the projection type light source device. Whether or not an optical axis is proper is inspected based on a shift of the cutoff line with respect to the acceptance reference cutoff line. Only a transmissive light passing through a substantially central portion in a vertical direction of a projection lens including an optical axis of the projection lens is guided onto the screen by the shade.

9 Claims, 7 Drawing Sheets

OPTICAL AXIS INSPECTION METHOD AND OPTICAL AXIS INSPECTION APPARATUS

This application claims foreign priority from Japanese Patent Application No. 2007-240684 filed on Sep. 18, 2007, the entire contents of which are hereby incorporated by reference.

BACKGROUND OF THE INVENTION

1. Field of the Invention

The invention relates to an optical axis inspection method and optical axis inspection apparatus for inspecting whether or not an optical axis of a projection type light source device of a vehicle lighting apparatus or an optical axis of a headlamp provided with the projection type light source device is proper. Especially, the invention relates to an optical axis inspection method and optical axis inspection apparatus for inspecting whether or not an optical axis is proper when a light distribution pattern of a projection type light source unit or a headlamp, which is an object to be inspected, projected onto a screen is captured and subjected to image processing so as to find a cutoff line and the thus found cutoff line is compared with an acceptance reference cutoff line.

2. Background Art

Patent Documents 1 and 2 disclose an optical axis inspection method and optical axis inspection apparatus in which: a light distribution pattern of a headlamp, which is an object to be inspected, projected onto a screen is captured; a cutoff line of the light distribution pattern is found by an image processing unit; both the acceptance reference cutoff line and the cutoff line described above are displayed on a display unit; it is judged whether or not an optical axis is proper by whether or not both the cutoff lines (images) agree with each other; and when the optical axis is not proper, a position of the headlamp is adjusted so that both the cutoff lines (images) can agree with each other.

Patent Document 3 discloses a vehicle headlamp in which: a plurality of projection type light source units (Each light source unit includes a light emitting element, a reflector, a shade for forming a cutoff line and a projection lens.), the light sources of which are light emitting elements, are integrated into a single light source unit assembly arranged in parallel with each other. When light is emitted from this light source unit assembly, a low beam is formed. This light source unit assembly is composed in such a manner that a plurality of light source units are assembled and integrated into a single body so that the respective optical axes can be arranged in parallel with each other on a front face side of a lamp bracket. When light distribution patterns formed by the respective light source units are synthesized with each other, a light distribution pattern of a low beam of the headlamp is formed.

[Patent Document 1] JP-A-59-024232
[Patent Document 2] JP-A-63-113339
[Patent Document 3] JP-A-2005-166588

In the light source unit assembly in Patent Document 3, all optical axes of the projection type light source units composing the light source unit assembly are designed to be in parallel with each other. That is, all optical axes of the projection type light source units are designed so that the cutoff lines of the light distribution patterns of the light source units can agree with each other. However, the following problems may be encountered. For some reasons, by an error caused at the time of assembling, the optical axes of the light source units are not parallel with each other and the cutoff lines of the light distribution patterns of the respective light source units do not agree with each other, that is, an improper synthesized light distribution pattern is formed.

Therefore, before the light source unit assembly is assembled as a headlamp, it is necessary to inspect whether or not all the optical axes of the respective light source units are parallel with each other, that is, it is necessary to inspect whether or not the cutoff lines of the light distribution patterns of the light source units agree with each other. The light source unit assembly is deliberately manufactured so that the accuracy of parts related to the optical axes in the upper, lower, right and left direction of the light source units can be the same with each other. For example, allowable values of the deviation of the optical axes of the light source units are set at ±0.1° in the vertical direction and ±0.13° in the lateral direction. As described above, the allowable values in the vertical direction, which are directly connected to the visibility and the glare light given to an opposed car, are more severely set than the allowable values in the lateral direction. The reason is that when the cutoff lines in the vertical direction of the light distribution patterns of the light source units agree with each other, that is, when the optical axes are parallel with each other in the vertical direction, the optical axes in the lateral direction agree with each other, that is, the optical axes in the lateral direction become parallel with each other.

Therefore, an inventor of the invention considered as follows. Illumination light of each light source unit is introduced onto a screen. A light distribution pattern projected on the screen is taken in as an image by a television camera and subjected to image processing. By the above processing, a cutoff line of the light distribution pattern of each light source is found. A shift in the vertical direction of the cutoff line of the light distribution pattern made by the light source unit with respect to the reference cutoff line is measured. In this case, the reference cutoff line is, for example, a cutoff line of the light distribution pattern made by the light source unit for illuminating mainly a neighborhood of a hot zone. From the thus measured shift, it is possible to judge whether or not the optical axes of the light source units composing the light source unit assembly are proper, that is, it is possible to judge whether or not the optical axes of the light source units are parallel with each other.

Therefore, the inventor started developing an inspection method and an inspection apparatus for inspecting whether or not the optical axes of the light source unit assembly, the stricture of which is shown in Patent Document 3, are proper, that is, whether or not the optical axes of the light source unit assembly, the structure of which is shown in Patent Document 3, are parallel with each other, by utilizing the prior art (the optical axis inspection apparatus) disclosed in Patent Documents 1 and 2. In this developing process, the following problems were encountered. Cutoff lines of the light distribution patterns of the light source units, which were projected on the screen, were not clear. Therefore, it was impossible to accurately find the cutoff line by the image processing. Accordingly, the accuracy of the optical axis inspection could not be enhanced.

That is, the following were found. In a light that is passing thorough the projection lens and directed to the screen, the light passing through an upper portion or a lower portion of the lens, the thickness of which is suddenly changed on a vertical cross section of the lens, is greatly affected by chromatic aberration. Therefore, a red and a blue lamination line (An upper portion is red and a lower portion is blue.) are made to appear along the cutoff one on the light distribution pattern projected on the screen and further, blur is generated on the cutoff line. Therefore, the cutoff line on the light distribution pattern formed by the light through the projection lens becomes unclear. Accordingly, it is impossible to find an accurate cutoff line by the image processing.

SUMMARY OF THE INVENTION

In order to solve the above problems, the inventor considered as follows. A factor, which makes the cutoff line on the light distribution pattern projected on the screen unclear, is avoided, that is, in the light through the projection lens, the light, which is greatly affected by chromatic aberration in the vertical direction, is shut off and only the light, which is seldom affected by chromatic aberration in the vertical direction, is introduced onto the screen, that is, only the transmissive light through a substantially central portion in a vertical direction including the optical axis of the projection lens is introduced onto the screen.

Therefore, the inventor produced an optical axis inspection apparatus by way of experiment and verified the effects. It was confirmed that the above countermeasures were effective. Further, the following were found. Concerning the object to be inspected, of course, the countermeasures are effective for the inspection of the light source unit assembly. Further, the countermeasures are effective for the inspection of a headlamp having a light source unit assembly in a lighting chamber defined by a front face cover and a lamp body. Furthermore, the countermeasures are effective for the inspection of an optical axis of a headlamp having a single projection type light source unit provided in a light chamber.

The invention has been accomplished in view of the above circumstances. One or more embodiments of the invention provide a method and a device capable of accurately inspecting whether or not an optical axis of a projection type light source device of a vehicle lighting apparatus or an optical axis of a headlamp provided with the projection type light source unit is proper.

In a first aspect of the invention, an optical axis inspection method of a projection type light source device is provided with the steps of: capturing a light distribution pattern of a projection type light source device of a vehicle lighting apparatus, which is an object to be inspected, projected on a screen; finding a cutoff line in the light distribution pattern by an image processing device; and inspecting whether or not an optical axis is proper based on a shift of the cutoff line in the vertical direction with respect to an acceptance reference cutoff line. The method further provided with the step of introducing only a transmissive light through a substantially central portion of in the vertical direction of a projection lens including an optical axis of the projection lens in the projection type light source device, onto a screen.

In a fifth aspect of the invention, an optical axis inspection apparatus of a projection type light source device is provided with: a stage for mounting a projection type light source device of a vehicle lighting apparatus which is an object to be inspected; a screen which is positioned in front of the stage; a camera for capturing a light distribution pattern of the light source device projected on the screen; an image processing device for finding a cutoff line in the light distribution pattern by processing image data captured by the camera; and an acceptance reference cutoff line setting unit. In the device, wherein whether or not an optical axis is proper is inspected based on a shift of the cutoff line with respect to the acceptance reference cutoff line. In the device, a shade having an oblong slit and arranged in the front portion of the stage to be opposed to a projection lens of the projection type light source device. Only a transmissive light through a substantially central portion in the vertical direction of the projection lens including an optical axis of the projection lens is guided onto the screen, by the shade.

(Advantage of the First and Fifth Aspects)

The shift from the acceptance reference cutoff line, which is set by the acceptance reference cutoff line setting unit, to the cutoff line found by the image processing of the light distribution pattern of the projection type light source device which is projected on the light distribution screen so that it can be inspected, is detected. Whether or not the optical axis of the projection type light source device is proper is inspected by whether or not the shift exists, that is, by whether or not the shift is lower than a predetermined value.

In the light that is transmissive through the projection lens and directed to the screen so that the light distribution pattern of the projection type light source can be projected, the light through an upper portion or a lower portion of the lens, the thickness of which is suddenly changed on a vertical cross section of the lens, is greatly affected by chromatic aberration. This light is shielded by the shade arranged in front of the projection lens. On the other hand, the transmissive light through the substantially central portion of the lens in the vertical direction of the lens including the optical axis of the lens, the thickness of which is not suddenly changed on the lens perpendicular cross section is seldom affected by chromatic aberration. This light is made to pass through the slit and introduced onto the screen. Therefore, the light distribution pattern of the projection type light source device is projected onto the screen by the light which is seldom affected by chromatic aberration in the vertical direction. Accordingly, there is no possibility that red and blue lamination layers appear along the cutoff line on the projected light distribution pattern and that blur is generated on the cutoff line. Therefore, it is possible to form a clear cutoff line. Consequently, an accurate cutoff line can be found by the image processing.

According to a second aspect of the invention, in an optical axis inspection method of the first aspect, the acceptance reference cutoff line, the cutoff line found by the image processing device and a result of the inspection may be displayed on a display unit.

According to a sixth aspect of the invention, the optical axis inspection apparatus of the fifth aspect may further include a display unit for displaying the acceptance reference cutoff line, the cutoff line found by the image processing device and a result of the inspection.

(Advantage of the Second and Sixth Aspects)

It is possible to recognize the acceptance reference cutoff line which has been set, the cutoff line found by the image processing device and the result of the inspection through the display device.

According to a third aspect of the invention, in an optical axis inspection method of the first or second aspect, the projection type light source device may include a plurality of projection type light source units for forming light distribution patterns which are different from each other and in which at least a portion of the cutoff line is common, a cutoff line of a projection light distribution pattern of one of the projection type light source units may be set to be the acceptance reference cutoff line, and cutoff lines of another projection type light source units may be respectively compared with the acceptance reference cutoff line.

According to a seventh aspect of the invention, in the optical axis inspection apparatus of the fifth or sixth aspect, the projection type light source device may include a plurality of projection type light source units for forming light distribution patterns which are different from each other and in which at least a portion of the cutoff line is common, and a slit corresponding to each projection lens may have a shutter for opening and closing the slit.

(Advantage of Third and Seventh Aspects)

In the case where the object to be inspected is an assembly having a plurality of projection type light source units, a projection light distribution pattern of one of the projection type light source units, which is a reference to compose the light source device, is captured and a cutoff line is found by the image processing device. The thus found cutoff line is stored as the acceptance reference cutoff line and displayed on the display unit when necessary. Cutoff lines of the light distribution patterns of another projection type light source units (the second and the third light source unit) found in the same manner are respectively stored. The cutoff lines may be displayed on the display unit and respectively compared with the acceptance reference cutoff line described above (the cutoff line of one projection type light source unit which is the reference). In this way, whether or not the optical axis of the light source unit assembly is proper is judged.

For example, in the case where cutoff lines of all the light distribution patterns of the another projection type light source units are not shifted from the acceptance reference cutoff line (the cutoff line of one projection type light source unit which is the reference), that is, in the case where an amount of shift is not more than an allowed value, it is judged that the optical axis of the projection type light source unit assembly is proper. In the case where even one of the light distribution patterns of another projection type light source units is shifted from the acceptance reference cutoff line (the cutoff line of one projection type light source unit which is the reference), that is, in the case where an amount of the shift exceeds the allowed value, it is judged that the optical axis of the projection type light source unit assembly is improper.

As described above, the optical axis of the projection type light source unit assembly is judged by whether or not the cutoff lines of the projection type light distribution patterns of the other projection type light source units, which are found from the projection light distribution patterns, are respectively shifted from the cutoff line (the cutoff line of the acceptance reference) which is found from the projection light distribution pattern of one projection type light source unit which is the reference. However, in order to find the cutoff line of the light distribution pattern of a predetermined projection type light source unit, for example, as the seventh aspect, the shutter corresponding to the predetermined projection type light source unit (the projection lens) is driven so that only the corresponding slit can be opened while the slit corresponding to the other projection type light source unit is being closed by the shutter. In this way, when only the light of the predetermined projection type light source unit is projected onto the screen, the cutoff line of the light distribution pattern of the predetermined projection type light source unit can be found.

In this connection, instead of driving the shutter, only the light of the predetermined projection type light source unit may be projected onto the screen when the light source unit is selectively lit by controlling an electric power supply to the light source unit (the light emitting diode) composing the light source unit assembly.

According to fourth aspect of the invention, in the optical axis inspection method of first or second aspect, the projection type light source device may include a plurality of projection type light source units for forming light distribution patterns which are different from each other and in which at least a portion of the cutoff line is common, and the projection type light source device may be composed as a vehicle headlamp accommodated in a lighting chamber and is capable of adjusting an aiming, and the light distribution pattern of the light source device (headlamp) maybe captured and an aiming adjustment may be made so that a shift of the cutoff line with respect to the acceptance reference cutoff line is eliminated.

According to a eighth aspect of the invention, in an optical axis inspection apparatus of fifth or sixth aspect, the projection type light source device may include a plurality of projection type light source units for forming light distribution patterns which are different from each other and in which at least a portion of the cutoff line is common, and the projection type light source device may be composed as a vehicle headlamp which is accommodated in a lighting chamber and is capable of adjusting an aiming.

(Advantage of Fourth and Eighth Aspects)

The fourth and eighth aspects correspond to the case that the object to be inspected is a headlamp including a plurality of projection type light source units. A projection light distribution pattern of the headlamp (the light source assembly) is captured and then a cutoff line is found by the image processing device. When the thus found cutoff line is shifted from a predetermined acceptance reference cutoff line, the aiming adjustment is made so that the shift can be eliminated, that is, so that a proper light distribution can be obtained. Whether or not the optical axis is proper is inspected by whether or not the aiming adjustment can be made so that the shift can be eliminated.

According to the optical axis inspection method of the first aspect and the optical axis inspection apparatus of the fifth aspect, when a cutoff line of the light distribution pattern projected onto the screen is made clear, an accurate cutoff line is found by the image processing device. Accordingly, the optical axis of the projection type light source unit of the vehicle lighting apparatus can be highly accurately inspected.

According to the optical axis inspection method of the second aspect and the optical axis inspection apparatus of the sixth aspect, the acceptance reference data, the measurement data and the inspection result can be obtained as information through the display device. Accordingly, the inspection reliability can be enhanced.

According to the optical axis inspection method of the third aspect and the optical axis inspection apparatus of the seventh aspect, an optical axis inspection of the projection type light source unit assembly can be highly accurately executed.

According to the optical axis inspection method of the fourth aspect and the optical axis inspection apparatus of the eighth aspect, an optical axis inspection including the light distribution inspection of the headlamp having a projection type light source unit assembly can be highly accurately executed.

Other aspects and advantages of the invention will be apparent from the following description, the drawings and the claims.

BRIEF DESCRIPTION OF THE DRAWINGS

FIGS. 3(a) to 3(d) are views showing light distribution patterns of a projection type light source unit assembly, wherein

FIGS. 7(a) and 7(b) are views showing a projection lens which is a primary portion of a light source unit which is an object to be inspected of the optical axis inspection apparatus of a second embodiment of the invention, wherein

DETAILED DESCRIPTION OF THE EXEMPLARY EMBODIMENTS

Exemplary embodiments of the invention are explained with reference to drawings.

Figure 1:
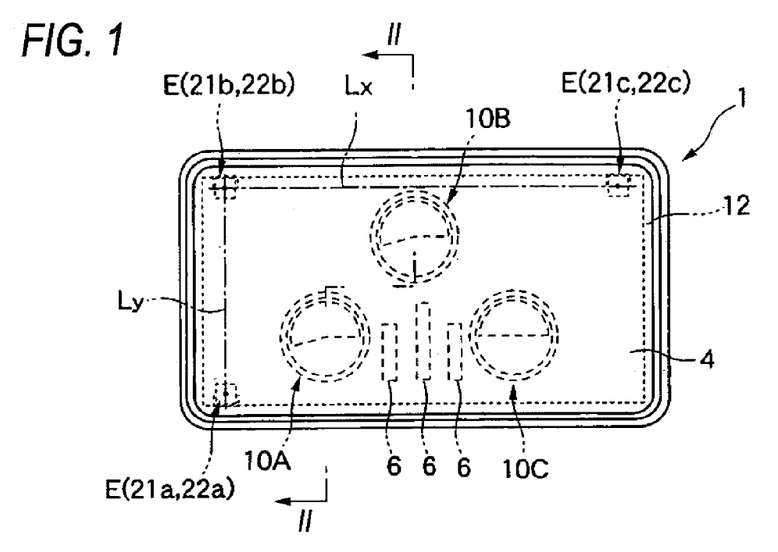
FIG. 1 is a front view showing a vehicle headlamp having a projection type light source unit of an embodiment.
Figure 2:
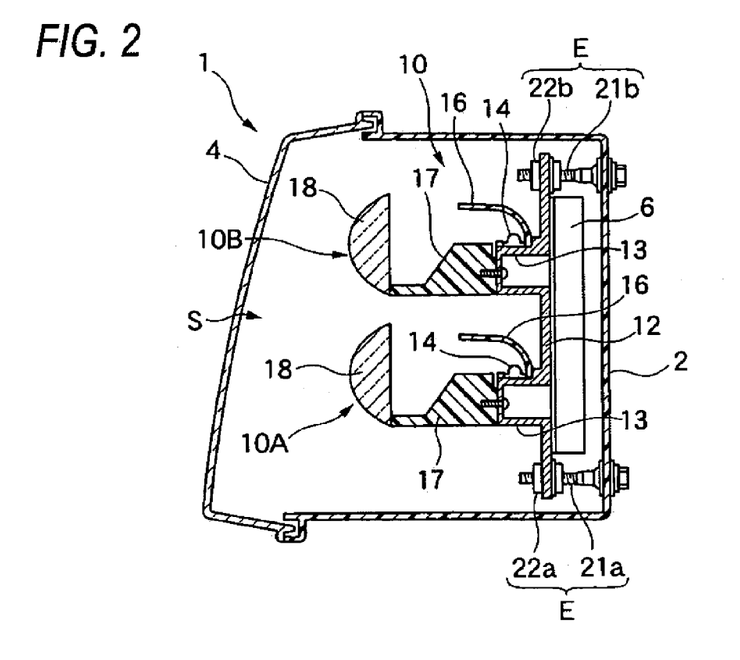
FIG. 2 is a longitudinal sectional view (a sectional view taken on line II-II in FIG. 1) of the headlamp.
Figure 3:
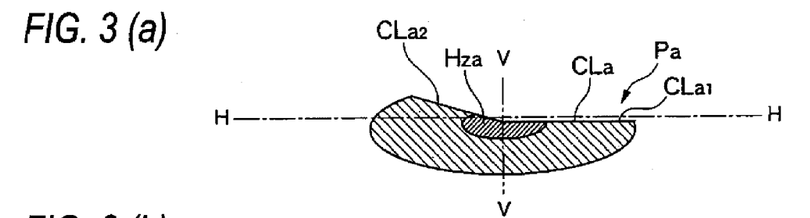
FIG. 3(a) is a front view showing a light distribution pattern of a light source unit for condensing light.
FIG. 3(b) is a front view showing a light distribution pattern of a light source unit for middle diffusion.
FIG. 3(c) is a front view showing a light distribution pattern of a light source unit for large diffusion and FIG. 3(d) is a front view showing a light distribution pattern of a projection type light source unit assembly.
Figure 4:
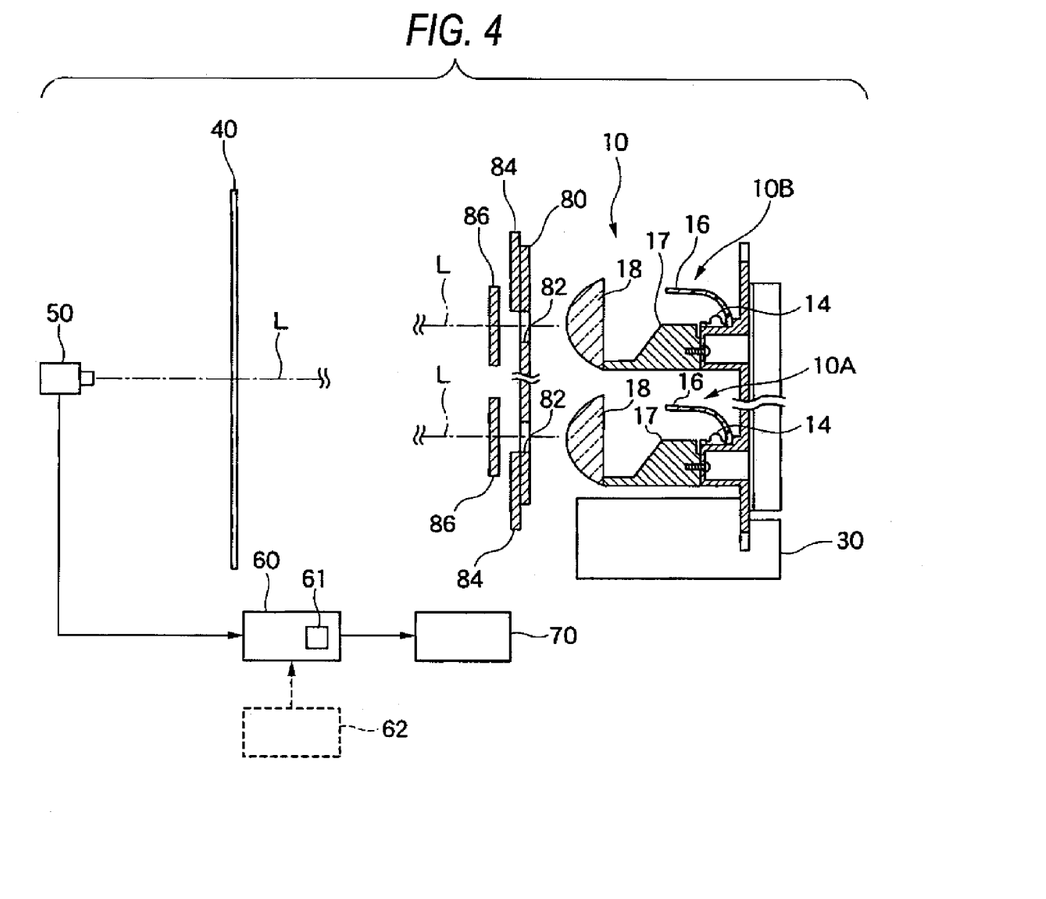
FIG. 4 is a side view of an optical axis inspection apparatus, wherein a portion is shown by a cross section.
Figure 5:
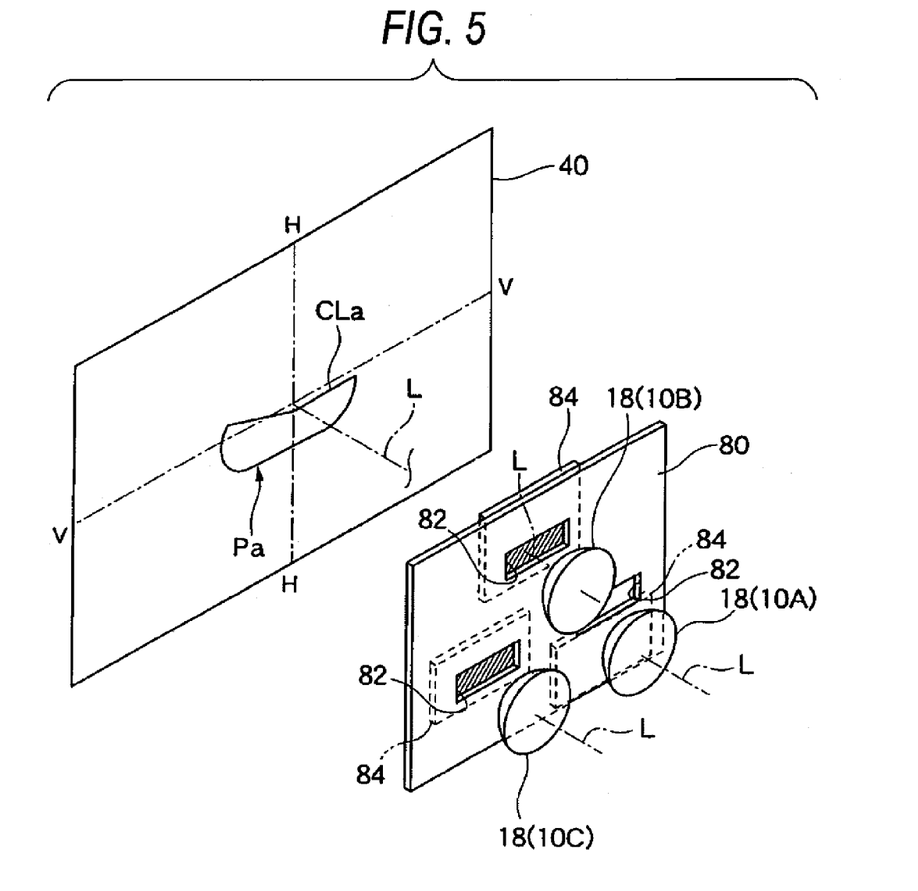
FIG. 5 is a perspective view showing a primary portion of the optical axis inspection apparatus.
Figure 6:
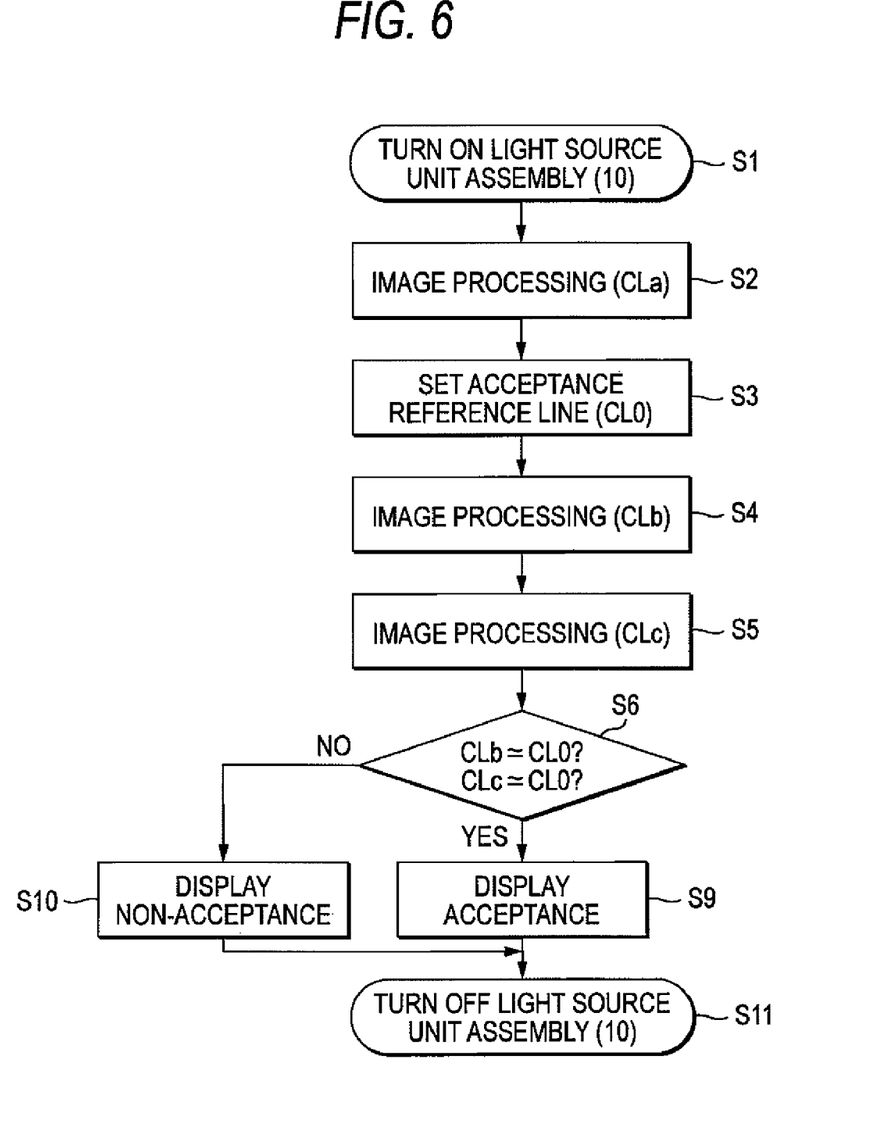
FIG. 6 is a flow chart for the optical axis inspection.

FIGS. 1 to 6 are views showing a first embodiment of an optical axis inspection apparatus of the invention. FIG. 1 is a front view showing a vehicle headlamp. FIG. 2 is a longitudinal sectional view (a sectional view taken on line II-II in FIG. 1) of the headlamp. FIGS. 3(a) to 3(d) are views showing light distribution patterns of a projection type light source unit assembly which is an object to be inspected, wherein FIGS. 3(a) to 3(c) are front views respectively showing a light distribution pattern of each projection type light source unit composing a projection type light source unit assembly and FIG. 3(d) is front view showing a light distribution pattern of each projection type light source unit assembly. FIG. 4 is a side view of the optical axis inspection apparatus, wherein a portion is shown by a cross section. FIG. 5 is a perspective view showing a primary portion of the optical axis inspection apparatus. FIG. 6 is a flow chart for the optical axis inspection.

In FIGS. 1 and 2, the vehicle headlamp 1 is composed in such a manner that the light source unit assembly 10 (as a projection type light source device), in which three projection type light source units 10A, 10B, 10C are integrated with each other into a single body, is accommodated in a lighting chamber S defined by a container-shaped lamp body 2 and a transparent front cover 4. The light source unit assembly 10 is supported so that the light source unit assembly 10 can be inclined in a vertical and a lateral directions by an aiming mechanism E which is interposed between the light source unit assembly 10 and the lamp body 2, that is, the light source unit assembly 10 is supported so that an aiming can be adjusted.

The light source unit assembly 10 is composed in such a manner that three projection type light source units 10A, 10B, 10C are integrated in parallel with each other into one body on the front face side of the rectangular lamp bracket 12 which is a supporting member made of metal. Each projection type light source unit 10A, 10B, 10C includes: a light emitting diode 14 which is a light source attached onto an upper face side of the front swelling portion 13 of the bracket 12; a reflector 16 made of resin attached onto an upper face side of the front swelling portion 13 so that the reflector 16 can cover the light emitting diode 14; a shade 17 made of resin used for forming a cutoff line attached to a front end portion of the front swelling portion 13; and a convex projection lens 18 made of resin attached to a front end portion of the shade 17. Reference numeral 24 represents heat radiating fins integrally provided in the lamp bracket 12 at predetermined positions on the front face side and the rear face side of the lamp bracket 12.

Shapes of the upper edge portions of the shades 17 of the respective projection type light source units 10A, 10B, 10C are different from each other. Therefore, as shown in FIGS. 3(a) to 3(c), the light distribution patterns Pa, Pb, Pc, which are different from each other, are formed. Specifically, the light source unit 10A is composed as a projection type light source unit for condensing light which forms the small diffusion light distribution pattern Pa shown in FIG. 3(a). The light source unit 10B is composed as a middle projection type light source unit for diffusing light which forms the middle diffusion light distribution pattern Pb shown in FIG. 3(b). The light source unit 10C is composed as a large projection type light source unit for forming the large diffusion light distribution pattern Pc shown in FIG. 3(c). When three light distribution patterns Pa, Pb, Pc are synthesized with each other, the light source unit assembly 10 forms a predetermined low beam light distribution pattern P shown in FIG. 3(d).

In FIGS. 3(a) to 3(d), reference marks CLa, CLb, CLc, CL are cutoff lines of the light distribution patterns Pa, Pb, Pc, P. Reference marks CLa1, CLb1, CLc1, CL1 are horizontal cutoff lines. Reference marks CLa2, CLb2, CL2 are oblique cutoff lines inclined by the angle of 15°. Reference mark CP is an elbow point at which the horizontal cutoff line and the oblique cutoff line inclined by the angle of 15° cross each other. Reference marks Hza, Hzb, Hzc, Hz are hot zones, the luminous intensity of which is the highest in the light distribution patterns Pa, Pb, Pc, P. The cutoff lines CLa, CLb, CLc of the light distribution patterns Pa, Pb, Pc are in cooperation with each other and form the cutoff line CL of the light distribution pattern P. That is, when the projection type light source units 10A, 10B, 10C are assembled to the lamp bracket 12 and integrated with each other into one body as the light source unit assembly 10, the cutoff lines CLa, CLb, CLc of the light distribution patterns Pa, Pb, Pc agree with each other.

The aiming mechanism E includes: three aiming screws 21a, 21b, 21c pivotally supported by the insertion holes provided on the rear face wall of the lamp body 2; and aiming nuts 22a, 22b, 22c attached to the lamp bracket 12 in such a manner that the aiming nuts 22a, 22b, 22c are screwed to the aiming screws 21a, 21b, 21c. When the aiming screws 21a, 21c are rotated, the lamp bracket 12, by which the light source unit assembly 10 is integrated into one body, can be adjusted being inclined round the horizontal inclination axis (the axis passing through the nuts 22b, 22c) Lx and the vertical inclination axis (the axis passing through the nuts 22b, 22a) Ly. That is, the aiming screw 21a functions as a vertical direction aiming screw and the aiming screw 21c functions as a lateral direction aiming screw.

The light source unit assembly 10 is designed so that all the optical axes of the projection type light source units 10A, 10B, 10C can be parallel with each other, that is, so that the cutoff lines CLa, CLb, CLc on the light distribution patterns of the light source units 10A, 10B, 10C can agree with each other in the vertical direction. To be in more detail, the light source unit assembly 10 is deliberately made so that the accuracy of parts related to the optical axes in the vertical and the lateral direction of the light source units 10A, 10B, 10C can be the same. Allowable values of the optical axes of the light source units 10A, 10B, 10C are ±0.1° in the vertical direction and ±0.13° in the lateral direction. As described above, the allowable values in the vertical direction, which are directly connected to the visibility and the glare light given to an opposed car, are more severely set than the allowable values in the lateral direction. That is, when the cutoff lines of the distribution patterns of the light source units 10A, 10B, 10C agree with each other in the vertical direction, that is, when the optical axes are parallel with each other in the vertical direction, the optical axes agree with each other in the lateral direction, too, that is, the optical axes are parallel with each other.

However, concerning the light source unit assembly 10, for some reasons, for example, by an error caused at the time of assembling, all the optical axes of the light source units 10A, 10B, 10C are not parallel with each other and the cutoff lines CLa, CLb, CLc of the light distribution patterns of the respective light source units 10A, 10B, 10C do not agree with each other, that is, an improper synthesized light distribution pattern is formed.

Therefore, before the light source unit assembly 10 is assembled as a headlamp 1, it is necessary to inspect whether or not all the optical axes of the respective light source units 10A, 10B, 10C are parallel with each other, that is, it is necessary to inspect whether or not the cutoff lines CLa, CLb, CLc of the light distribution patterns of the light source units 10A, 10B, 10C agree with each other in the vertical direction. An optical axis inspection apparatus used for the above object is shown in FIGS. 4 to 6.

In FIGS. 4 to 6, the optical axis inspection apparatus mainly includes: a stage 30 on which the light source unit assembly 10, which is an object to be inspected, is mounted; a screen 40 arranged in front of the stage 30 being positioned; a television camera (CCD camera) 50, which is arranged at the rear of the screen 40, for capturing a light distribution pattern of the light source unit assembly 10 projected on the screen 40; an image processing device 60 for finding a cutoff line of the light distribution pattern by processing image data captured by the television camera 50; and a display unit (a monitor television set) 70 for displaying an acceptance reference cutoff line which has been inputted, a cutoff line found by the image processing device 60 and a result of the judgment of success or failure. When the thus found cutoff line is compared with the acceptance reference cutoff line, whether or not the optical axis of the light source unit assembly 10 is proper is inspected.

In front of the stage 30 (in front of the projection type light source unit assembly 10 mounted on the stage 30), the shade 80 having an oblong slit 82 is arranged being rightly opposed to the projection type light source unit assembly 10 mounted on the stage 30. The oblong slit 82 is arranged at a position corresponding to the optical axis L of the projection convex lens 18 of each light source unit 10A, 10B, 10C of the light source unit assembly 10 mounted on the stage 30. The lateral length of the slit 82 is substantially the same as the outer diameter of the projection convex lens 18. The width d in the vertical direction of the slit 82 is formed into a predetermined size by which only the transmissive light through the substantial central portion in the vertical direction of the projection convex lens 18, in which the lens thickness on the perpendicular cross section of the lens 18 is not suddenly changed, that is, in which the lens thickness is substantially constant in the vertical direction of the projection convex lens 18, can be made to pass through, that is, only the light, which is seldom affected by the chromatic aberration in the vertical direction can be made to pass through.

The slit opening and closing shutter 84 driven, for example, by an electromagnetic solenoid (not shown) is arranged in the neighborhood of each slit 82. Therefore, each slit 82 can be independently opened and closed.

That is, with respect to the projection type light source unit assembly 10 (the light source units 10A, 10B, 10C) which is in a state of lighting, the predetermined shutter 84 is driven so as to open only a predetermined slit 82 and only the light distribution pattern of the predetermined light source unit (one of the light source units 10A, 10B and 10C) can be projected onto the screen 40. For example, FIG. 5 shows a state in which only the slit 82 corresponding to the light source unit 10A is opened and only illumination light of the light source unit 10A is introduced onto the screen 40 and only the light distribution pattern Pa of the light source unit 10A is projected onto the screen 40.

Reference mark 86 (shown in FIG. 4) is a Fresnel lens, which is arranged in front of each slit 82, for forming a clear image of the cutoff line of the light distribution pattern on the screen 40. In this type optical axis inspection or light distribution inspection, in general, an object to be inspected is separated from the screen by the distance of 25 m. However, when the Fresnel lens is used, the distance between the light source unit assembly 10, which is an object to be inspected, and the screen 40 can be shortened to the distance of about 730 mm.

An image signal sent from the television camera 50 is inputted into the image processing device 60. The thus inputted image signal is converted by A/D converter in the image processing device 60 and the thus converted signal is stored in a memory. On the other hand, CPU 61, which executes processing of calculation according to an inspection program stored in the memory, outputs image information, which is a result of the calculation, from an output port. A controller having video RAM, which receives the signal from the output port, converts the image information into the television image information and displays it on the display unit (the monitor television set) 70.

From the television image signal of the light distribution pattern, the image processing device 60 finds the brightest point on the light distribution pattern, the cutoff line, the elbow portion and the distance between the brightest point and the elbow portion which will be referred to as a cutoff line and so forth, hereinafter. At the same time, these are stored and displayed on the display unit (the monitor television set) 70. Especially, at least with respect to the cutoff line, the display unit (the monitor television set) 70 displays its figure. In this connection, image processing of finding the cutoff line of the light distribution pattern from the television image signal of the light distribution pattern is well known being disclosed in Patent Documents 1 and 2. Therefore, the detail explanations are omitted here.

Next, the inspection procedure executed by the optical axis inspection apparatus will be explained together with the operation of CPU 61 of the image processing device 60 referring to FIG. 6.

First, in step S1, the light source unit assembly 10 is set on the stage 30. Then, only the first slit 82 corresponding to the first projection type light source unit 10A is opened and the light source unit assembly 10 (the projection type light source unit 10A, 10B, 10C) is turned on. At this time, the television camera 50 captures the light distribution pattern Pa of the light source unit 10A projected onto the screen 40. Next, in step S2, a television image of the light distribution pattern Pa captured by the television camera 50 is taken in and image processing is carried out and the cutoff line CLa and others of the light distribution pattern Pa are found. In step S3, these measured values are stored as an acceptance reference and displayed on the display unit 70. That is, CPU 61 of the image processing device 60 functions as an input setting unit for setting the acceptance reference cutoff line and others. The acceptance reference cutoff line CL0 (the cutoff line CLa of the light distribution pattern Pa of the first projection type light source unit 10A) is also displayed as a figure.

Next, in step S4, only the second slit 82 corresponding to the second projection type light source unit 10B is opened and the television camera 50 captures the light distribution pattern Pb of the light source unit 10B projected on the screen 40. Therefore, a television image of the light distribution pattern Pb captured by the television camera 50 is taken in and image processing is carried out. Then, the cutoff line CLb and others of the light distribution pattern Pb are found and stored and displayed on the display unit 70 at the same time. The found cutoff line CLb is also displayed as a figure.

Next, in step S5, only the third slit 82 corresponding to the third projection type light source unit 10C is opened and the television camera 50 captures the light distribution pattern Pc of the light source unit 10C projected on the screen 40. Therefore, a television image of the light distribution pattern Pc captured by the television camera 50 is taken in and image processing is carried out. Then, the cutoff line CLc and others of the light distribution pattern Pc are found and stored and displayed on the display unit 70 at the same time. The found cutoff line CLc is also displayed as a figure.

Next, in step 56, the cutoff lines CLb, CLc respectively found in steps S4, S5 are respectively compared with the acceptance reference cutoff line CL0. Whether or not an amount of shift of the cutoff line CLb, CLc from the acceptance reference cutoff line is lower than a predetermined value is judged, that is, it is judged whether or not CLb is substantially the same with CL0 and CLc is substantially the same with CL0. In the case of YES, the acceptance is displayed on the display unit 70, for example, a green lamp is turned on and a chime is sounded. Then, the program transfers to step S11. On the other hand, in the case of NO in step S6, that is, in the case where an amount of shift of at least one of the cutoff lines CLb, CLc from the acceptance reference cutoff line CL0 is not less than a predetermined value, that is, in the case where CLb≠CL0 or CLc≠CL0, the program transfers to step S10. After a display of non-acceptance is made on the display unit 70, for example, after a red lamp is turned on and a buzzer is sounded, the program transfers to step S18.

In step S11, the third slit 82 is closed, that is, all the slits 82 are closed. At the same time, the light source unit assembly 10 (the projection type light source units 10A, 10B, 10C) is turned off and the routine shown in FIG. 6 is completed. Then, the light source unit assembly 10 is dismounted from the stage 30 and the device is made to prepare for the optical axis inspection of the next light source unit assembly 10.

Each oblong slit 82 in the present embodiment is provided corresponding to the optical axis L of each projection lens 18 of the light source unit assembly 10 mounted on the stage 30 (each light source unit 10A, 10B, 10C). The oblong slit 82 is formed so that only the light passing through the substantial central portion in the vertical direction of the lens including the optical axis L of the projection lens 18 of each light source unit 10A, 10B, 10C can be made to pass through the slit 82 and introduced onto the screen 40. Due to the foregoing, the cutoff lines CLa, CLb, CLc of the light distribution patterns of the light source units 10A, 10B, 10C projected onto the screen 40 can be made clear. Accordingly, the cutoff lines CLa, CLb, CLc of the respective light distribution patterns can be more accurately found by image processing.

That is, in the light through the projection convex lens 18, the light passing through an upper portion or a lower portion of the lens, the thickness of which is suddenly changed on a vertical cross section of the lens, that is, the light which is greatly affected by chromatic aberration is cut off by the shade 80 arranged in front of the projection lens 18. On the other hand, the light passing through the substantially central portion in the vertical direction of the lens including the optical axis L of the lens 18, the thickness of which is not suddenly changed in the lens perpendicular cross section, that is, the light which is seldom affected by chromatic aberration passes through the slit 82 and is introduced onto the screen 40. Therefore, the light distribution pattern of each light source unit 10A, 10B, 10C is selectively projected onto the screen 40 by the light which is seldom affected by the chromatic aberration in the vertical direction. Accordingly, there is no possibility that red and blue lamination layers appear along the cutoff line of the projected light distribution pattern and that blur is generated on the cutoff line. Therefore, the clear cutoff line CLa, CLb, CLc is formed on the screen 40. Therefore, by the image processing, the cutoff line CLa, CLb, CLc of the light distribution pattern Pa, Pb, Pc of the projection type light source unit 10A, 10B, 10C can be accurately found. Accordingly, a highly accurate optical axis inspection can be executed for the light source unit assembly 10.

In this connection, in the embodiment described above, the shutter 84 for opening and closing the slit is provided in the neighborhood of each slit 82 so that each slit 82 can be independently opened and closed. However, instead of the shutter 84 for opening and closing the slit, electric power supply to the optical source units 10A, 10B, 10C may be controlled so that the light source units 10A, 10B, 10C can be successively, singly turned on in the order of 10A→10B→10C.

In the embodiment described above, a surface of each convex lens 18 of the light source unit assembly 10 (the projection type light source units 10A, 10B, 10C), which is an object to be inspected, is formed out of a smooth continuous curved face. Accordingly, the light distribution of the headlamp 1 having the light source unit assembly 10 is affected by chromatic aberration. That is, in the headlamp 1 shown in FIGS. 1 and 2, red and blue lamination layer lines appear along the cutoff line CL of the light distribution pattern. Further, a difference between the brightness and the darkness on both sides in the lateral direction of the cutoff line CL is increased too large. Therefore, the visibility in front of the vehicle is not necessarily good.

Figure 7:
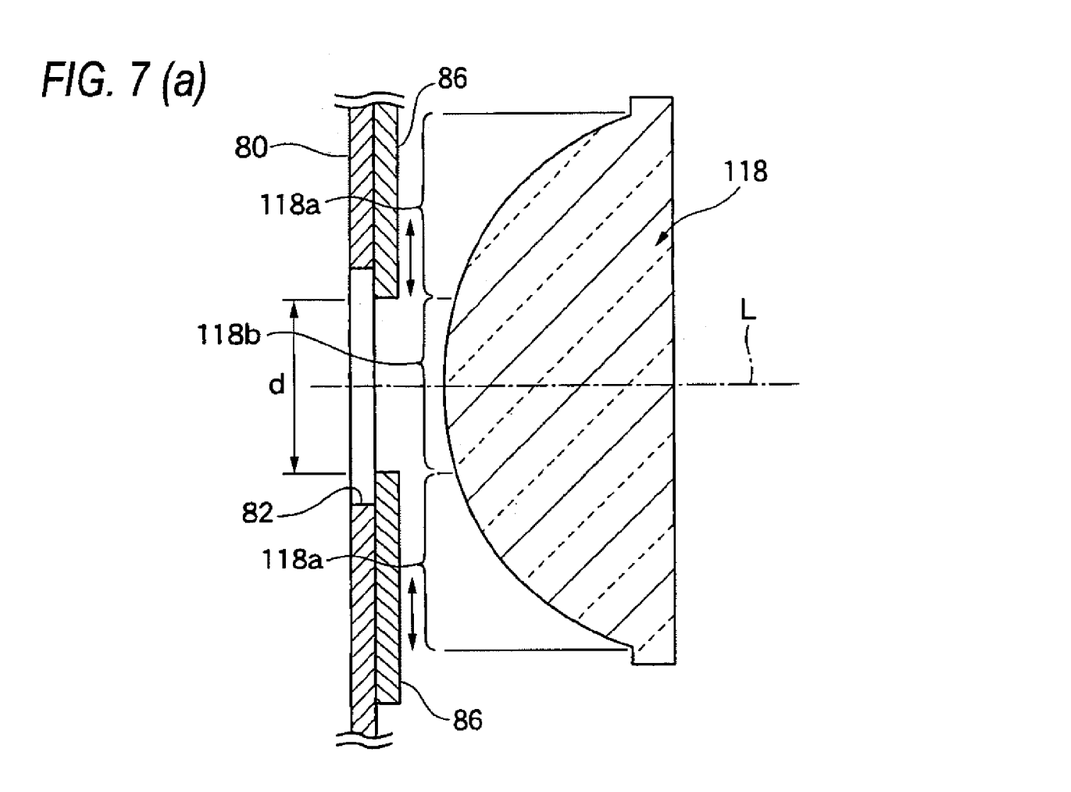
FIG. 7(a) is a longitudinal sectional view of the convex projection lens and FIG. 7(b) is a partially enlarged longitudinal sectional view of the convex projection lens.

Therefore, concerning the projection convex lenses 18 of the projection type light source units 10A, 10B, 10C, as shown in FIGS. 7(*a*) and 7(*b*), in the case of the headlamp having a light source unit assembly, which will be referred to as a second light source unit assembly, employing the projection convex lens 118 in which the vertical direction diffusion portion 118a formed out of a plurality of lens elements 118a1, 118a2 (the convex side lens element 118a1, the concave side lens element 118a2) extending in the substantially horizontal direction on the perpendicular cross section formed into a wave-shape with respect to the reference face 110 on an upper and a lower region of the lens in which the lens thickness is suddenly changed on the perpendicular cross section, a difference between the brightness and the darkness of the entire cutoff line on the light distribution pattern of the headlamp (the second light source unit assembly) is reduced by the vertical direction diffusion light formed by the vertical direction diffusion portion 118a. At the same time, no red and blue lamination layer lines appear along the cutoff line, that is, no spectral decrease caused by chromatic aberration appears. Accordingly, the visibility in front of the vehicle can be enhanced.

In this connection, in FIG. 7(a), reference mark 118b is a substantially central portion in the vertical direction including the optical axis L of the lens 118 between the vertical direction diffusion portion 118a on the upper side of the lens and the vertical direction diffusion portion 118a on the lower side of the lens. This substantially central portion 118b is a region, which is formed only out of the smooth reference surface 110, in which no vertical direction diffusion portion 118a is formed.

In the optical axis inspection apparatus of the second embodiment, the inspection object of which is this second light source unit assembly, as shown in FIG. 7(a), a pair of slit vertical width adjustment members 86 are provided at an upper and a lower position of the slit 82 of the shade 80. When the slit vertical width adjustment members 86 are slid in the vertical direction, the vertical width d of the slit 82 can be adjusted. The vertical width d of the oblique slit 82 formed in the shade 80 is adjusted at a size corresponding to the vertical width of the region 118b, in which no vertical direction diffusion portion is formed, including the optical axis L of the projection convex lens 118. Except for that, the structure is the same as that of the optical axis inspection apparatus (shown in FIGS. 4 to 6) of the first embodiment described above. Therefore, the duplicate explanations are omitted here.

At the time of inspecting the optical axis of this second light source unit assembly by using the optical axis inspection apparatus of the second embodiment, the light (the vertical direction diffusion light acting for reducing a difference between the brightness and the darkness of the entire cutoff line on the light distribution pattern) passing through a lens upper portion and a lens lower portion, in which the vertical direction diffusion portion 118a (a plurality of lens elements extending in the substantially horizontal direction on the perpendicular cross section formed into a wave-shape with respect to the reference surface) is provided, is cut off by the shade 80. Therefore, only by the light passing through the region 118b in which no vertical direction diffusion portion is formed, that is, only by the transmissive light passing through the lens in the substantially central portion in the vertical direction, in which the lens thickness is not suddenly changed on the lens perpendicular cross section, including the optical axis L of the lens 118, that is, only by the light that is seldom affected by chromatic aberration, the light distribution pattern of the projection type light source unit is projected onto the screen 40. Accordingly, in the same manner as that of the light source unit assembly 10 described above, it is possible to execute a highly accurate optical axis inspection.

In the first and the second embodiment described above, explanations are made into the inspection method and device for inspecting whether or not the optical axis is proper with respect to the light source unit assembly in which three projection type light source units are integrated with each other into one body. However, the number of the projection type light source units composing the light source unit assembly is not necessarily limited to three. It is sufficient that the number of the projection type light source units is two or more.

In the first and the second embodiment described above, explanations are made into an optical axis inspection method and device in the case where the light source unit assembly 10 is an object to be inspected. However, the invention of the present application can be also applied to an optical axis inspection of inspecting a headlamp having the light source unit assembly 10. In the third embodiment, explanations will be made into an optical axis inspection method and device for inspecting a headlamp 1 having the optical source unit assembly 10 in the lighting chamber S.

Concerning the light source unit assembly 10, after it has been confirmed by the optical axis inspection apparatus shown in FIGS. 4 to 6 that the optical axes L of the projection type light source units 10A, 10B, 10C agree with each other, that is, the optical axes L of the projection type light source units 10A, 10B, 10C are parallel with each other, the light source unit assembly 10 is assembled to the headlamp 1 in which aiming can be adjusted. However, whether or not a proper light distribution is obtained by the adjustment of aiming has not been inspected for the headlamp 1. Therefore, although the structure is substantially the same as that of the optical axis inspection apparatus shown in FIGS. 4 to 6, by the optical axis inspection apparatus composed in such a manner that the acceptance reference cutoff line can be inputted and set through the input setting switch shown in FIG. 4 by reference mark 62, the optical axis inspection is executed, that is, the light distribution is inspected so as to inspect whether or not the headlamp 1 can form a proper light distribution by executing the aiming adjustment.

In the embodiment of the third optical axis inspection apparatus, the headlamp 1, which is an object to be inspected, is mounted being positioned with respect to the stage 30 and the screen 40. Therefore, data of the preferable brightest point and cutoff line of the headlamp 1 on the screen 40 (the light source unit assembly 10) is previously inputted to the image processing device 60 as an acceptance reference through the input setting switch 62. From the light distribution pattern of the headlamp 1 (the light source unit assembly 10) projected onto the screen 40, the brightest point and the cutoff line are found by image processing. These measurement values are displayed on the display unit 70 together with the setting acceptance reference. Further, the display unit 70 also displays a shift (Δh, Δv) between the found cutoff line and the acceptance reference cutoff line. Therefore, an aiming adjustment is made by the aiming mechanism E so that the shift (the horizontal direction shift Δh, the vertical direction shift Δv) can be eliminated. By whether or the aiming adjustment can be made so that the cutoff line can agree with the acceptance reference, it is impossible to inspect whether or not the optical axis (the light distribution) of the headlamp 1 is proper.

In the above optical axis inspection apparatus, in front of the headlamp 1 mounted on the stage 30, the shade 80 is arranged in which the slits 82 are formed at positions respectively corresponding to the optical axes L of the projection lenses 18 of the projection type light source units 10A, 10B, 10C.

When the aiming adjustment is made for the headlamp 1, that is, when the light source unit assembly 10 is adjusted being inclined by the aiming mechanism E, the optical axes L of the projection lenses 18 of the projection type light source units 10A, 10B, 10C are integrally displaced (inclined) in the vertical and the lateral direction. Therefore, it is preferable that at least the vertical direction width d of the slit 82 is set at a somewhat larger value while consideration is being given to an inclination in the vertical direction of the optical axis L of the light source unit assembly 10 (each projection type light source unit 10A, 10B, 10C).

Figure 8:
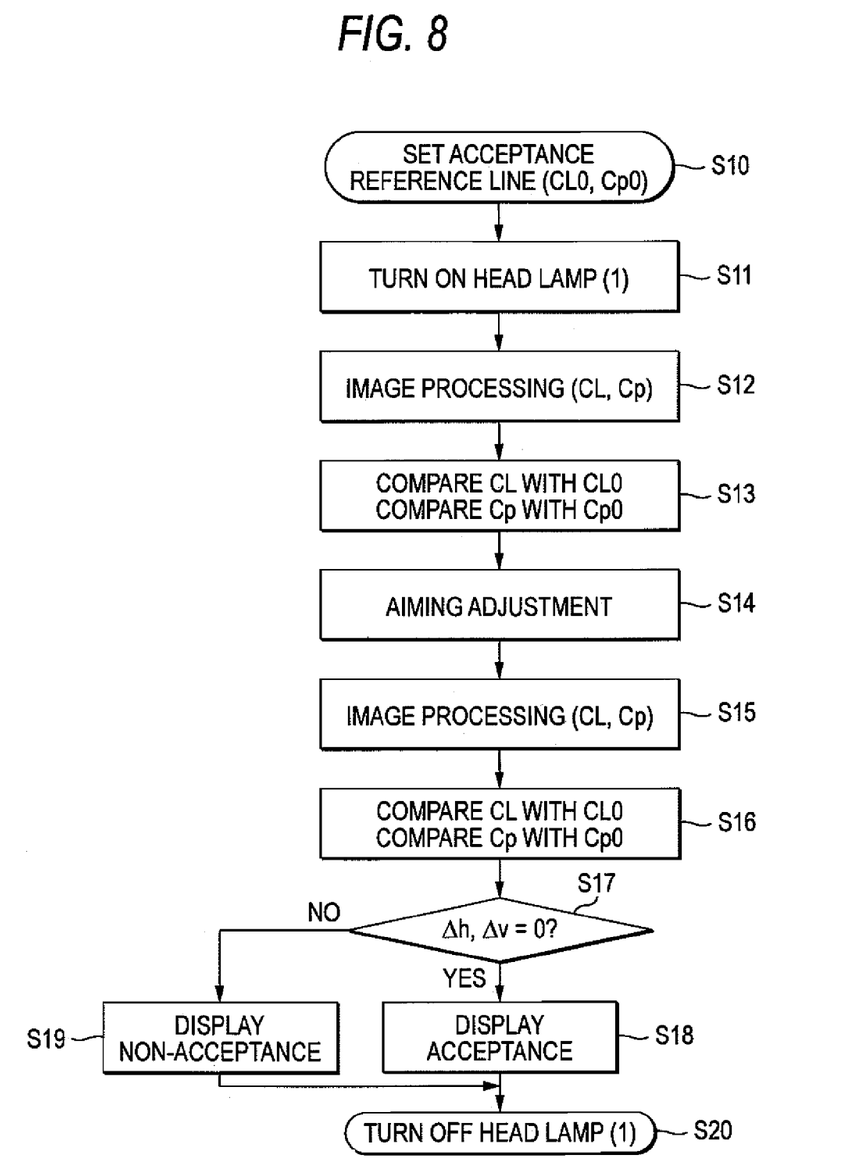
FIG. 8 is a flow chart for the optical axis inspection apparatus of inspecting a headlamp having a light source unit assembly in a primary portion of the optical axis inspection apparatus of the third embodiment of the invention.

FIG. 8 is a flow chart for the optical axis inspection executed by an optical axis inspection apparatus of the third embodiment of the invention. In this case, the optical axis inspection apparatus is an optical axis inspection apparatus, the inspection object of which is the headlamp 1 having the light source unit assembly 10.

First, in step S10, the headlamp 1 is set on the stage 30 and data including the preferable brightest point and the cutoff line of the headlamp 1 (the light source unit assembly 10) is inputted as the acceptance reference through the setting switch 62. Thus inputted data is stored as the reference acceptance and displayed on the display unit 70. The acceptance reference cutoff line CL0 and the elbow portion Cp0 are displayed on the display unit 70 as a figure.

Next, in step S11, the headlamp 1 (the light source unit assembly 10) is turned on. At this time, the television camera 50 captures the light distribution pattern P of the headlamp 1 (the light source unit assembly 10) projected onto the screen 40. Next, in step S12, a television image of the light distribution pattern P captured by the television camera 50 is taken in and subjected to image processing, so that the cutoff line PL and others of the light distribution pattern P can be found and stored and displayed on the display unit 70 at the same time. The cutoff line PL and the elbow portion Cp are also displayed on the display unit 70 as a figure.

Next, in step S13, the cutoff line CL and the elbow portion Cp, which have been found before, are respectively compared with the acceptance reference cutoff line CL0 and the elbow portion Cp0 so as to find the differences (the shifts in the horizontal and the vertical direction) $\Delta h$ and $\Delta v$. In step S14, an aiming adjustment is executed, that is, the aiming mechanism E is driven so that the shifts $\Delta h$ and $\Delta v$ in the horizontal and the vertical direction can be eliminated. After that, the program transfers to step S15. In steps S15 and S16, by the same image processing as that of steps S12 and S13, the cutoff line CL and the elbow portion Cp of the light distribution pattern of the headlamp 1 after the completion of the aiming adjustment are found and respectively compared with the acceptance reference cutoff line CL0 and the elbow portion Cp0. Then, the program transfers to step S17.

In step S17, in the case where the cutoff line CL (the elbow portion Cp) found in step S16 and the acceptance reference cutoff line CL0 (the elbow portion CP0) agree with each other, that is, in the case where the shifts $\Delta h$ and $\Delta v$ are respectively lower than a predetermined value, the acceptance is displayed on the display unit 70 in step S18 and then the program transfers to step S20. On the other hand, in the case where the shifts $\Delta h$ and $\Delta v$ are respectively higher than the predetermined value, it is impossible to form a proper light distribution in some cases even when the aiming adjustment is executed. Therefore, after the non-acceptance is displayed on the display unit 70 in step S19, the program transfers to step S20. In step S20, the headlamp 1 is turned off and the routine shown in FIG. 8 is finished.

In this connection, in the above explanations, an object to be inspected of the optical axis inspection apparatus of the third embodiment described above is the headlamp 1 having the light source unit assembly 10 in the lighting chamber S defined by the front face cover 4 and the lamp body 2. However, the object to be inspected may be a headlamp for forming a low beam in which a single projection type light source unit for forming a light distribution pattern having a predetermined cutoff line in the lighting chamber S defined by the front face cover 4 and the lamp body 2 is accommodated being capable of executing an aiming adjustment.

While description has been made in connection with specific embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS AND SIGNS

S Lighting chamber
10 Projection type light source unit assembly
10A Projection type light source unit for condensing light which is a basic projection type light source unit
10B Projection type light source unit for middle diffusion which is a second projection type light source unit
10C Projection type light source unit for large diffusion which is a third projection type light source unit
P Light distribution pattern for low beam of projection type light source unit assembly
Pa Light distribution pattern for small diffusion
Pb Light distribution pattern for middle diffusion
PC Light distribution pattern for large diffusion
CLa, CLb, PLc, PL Cutoff line
14 Light emitting diode of light source
16 Reflector
17 Shade for forming cutoff line
18, 118 Convex projection lend
L Optical axis of projection lens
E Aiming mechanism
21a, 21b, 21c Aiming screw
30 Stage for mounting object to be inspected
40 Screen
50 Television camera
60 Image processing device
61 CPU for composing acceptance reference cutoff line setting unit
62 Switch for composing acceptance reference cutoff line setting unit
70 Display unit
80 Shade
82 Slit
84 Shutter

What is claimed is:

1. An optical axis inspection method comprising:
projecting a light distribution pattern of a projection type light source device of a vehicle lighting apparatus, the projection type light source device being an object to be inspected;
introducing, onto a screen, only a transmissive light passing through a substantially central portion in a vertical direction of a projection lens of the projection type light source device including an optical axis of the projection lens, by shielding a light passing through an upper portion and a lower portion of the projection lens;
capturing the light distribution pattern formed on the screen by the introduced transmissive light;
finding a cutoff line within the captured light distribution pattern by an image processing device; and
inspecting whether or not an optical axis is proper, based on a shift of the cutoff line in the vertical direction with respect to an acceptance reference cutoff line.

2. The method according to claim 1, wherein an upper part of the light distribution pattern and a lower part of the light distribution pattern are shielded by a shade, in the introducing step.

3. The method according to claim 1, further comprising:
displaying, on a display unit, the acceptance reference cutoff line, the cutoff line found by the image processing device and a result of the inspection.

4. The method according to claim 1,
wherein the projection type light source device includes a plurality of projection type light source units for forming light distribution patterns which are different from each other and in which at least a portion of the cutoff line is common,
the method further comprising:

setting a cutoff line found in a projection light distribution pattern of one of the projection type light source units as the acceptance reference cutoff line; and respectively comparing cutoff lines of another projection type light source units, which are found successively, with the acceptance reference cutoff line.

5. The method according to claim 1, wherein the projection type light source device includes a plurality of projection type light source units for forming light distribution patterns which are different from each other and in which at least a portion of the cutoff line is common, and wherein the projection type light source device is composed as a vehicle headlamp accommodated in a lighting chamber and is capable of adjusting an aiming, the method further comprising:

adjusting the aiming so that the shift of the cutoff line from the acceptance reference cutoff line is eliminated.

6. An optical axis inspection apparatus comprising:

a stage on which a projection type light source device of a vehicle lighting apparatus is mounted, the projection type light source device being an object to be inspected;

a shade having an oblong slit and arranged in a front portion of the stage to be opposed to a projection lens of the projection type light source device, a screen positioned in front of the stage, wherein only a transmissive light passing through a substantially central portion in a vertical direction of the projection lens including an optical axis of the projection lens passes through the shade and is guided onto the screen;

a camera for capturing a light distribution pattern of the light source device formed on the screen by the transmissive light passing through the shade;

an image processing device configured to find a cutoff line of the light distribution pattern by processing image data captured by the camera; and an acceptance reference cutoff line setting unit, wherein whether or not an optical axis is proper is inspected based on a shift of the cutoff line with respect to the acceptance reference cutoff line.

7. The optical axis inspection apparatus according to claim 6, further comprising a display unit for displaying the acceptance reference cutoff line, the cutoff line found by the image processing device and a result of the inspection.

8. The optical axis inspection apparatus according to claim 6, wherein the projection type light source device includes a plurality of projection type light source units for forming light distribution patterns which are different from each other and in which at least a portion of the cutoff line is common, and the projection type light source device is composed as a vehicle headlamp which is accommodated in a lighting chamber and is capable of adjusting an aiming.

9. An optical axis inspection apparatus comprising:

a stage on which a projection type light source device of a vehicle lighting apparatus is mounted, the projection type light source device being an object to be inspected;

a screen positioned in front of the stage;

a camera for capturing a light distribution pattern of the light source device projected on the screen;

an image processing device configured to find a cutoff line of the light distribution pattern by processing image data captured by the camera;

an acceptance reference cutoff line setting unit, wherein whether or not an optical axis is proper is inspected based on a shift of the cutoff line with respect to the acceptance reference cutoff line; and a shade having an oblong slit and arranged in a front portion of the stage to be opposed to a projection lens of the projection type light source device, wherein only a transmissive light passing through a substantially central portion in a vertical direction of a projection lens including an optical axis of the projection lens is guided onto the screen, wherein the projection type light source device includes a plurality of projection type light source units for forming light distribution patterns which are different from each other and in which at least a portion of the cutoff line is common, and wherein each slit of the shade corresponding to each projection lens of each projection type light source unit has a shutter for opening and closing the slit.

* * * * *